J. E. GRAYBILL.
MACHINE FOR CUTTING GLASS TUBES.
APPLICATION FILED MAY 13, 1904.

921,828.

Patented May 18, 1909.
4 SHEETS—SHEET 1.

J. E. GRAYBILL.
MACHINE FOR CUTTING GLASS TUBES.
APPLICATION FILED MAY 13, 1904.

921,828.

Patented May 18, 1909.
4 SHEETS—SHEET 2.

Witnesses
J. G. Finkel
Thos. Howe

Inventor
by John E. Graybill
Foster Freeman & Watson
Attorneys

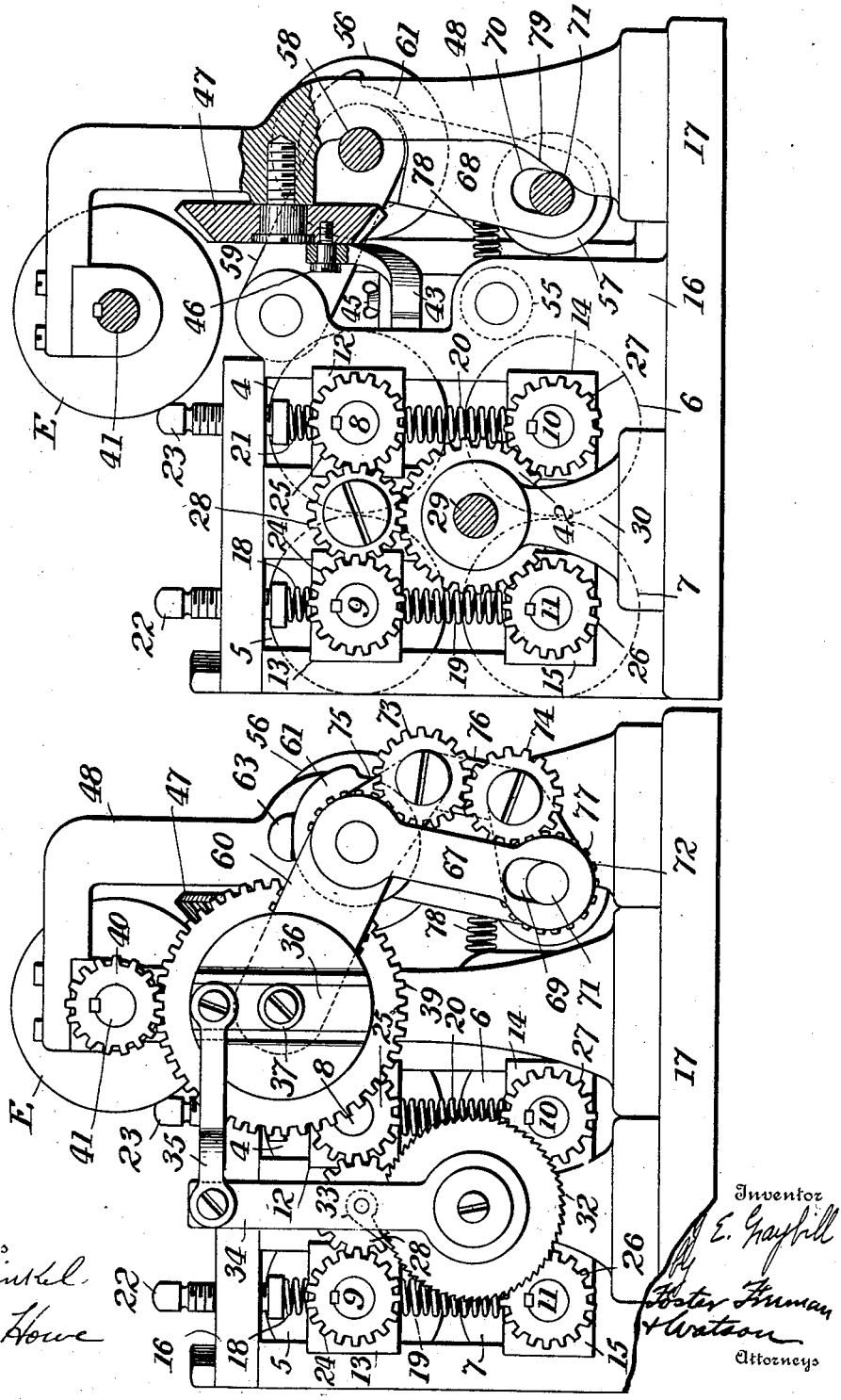

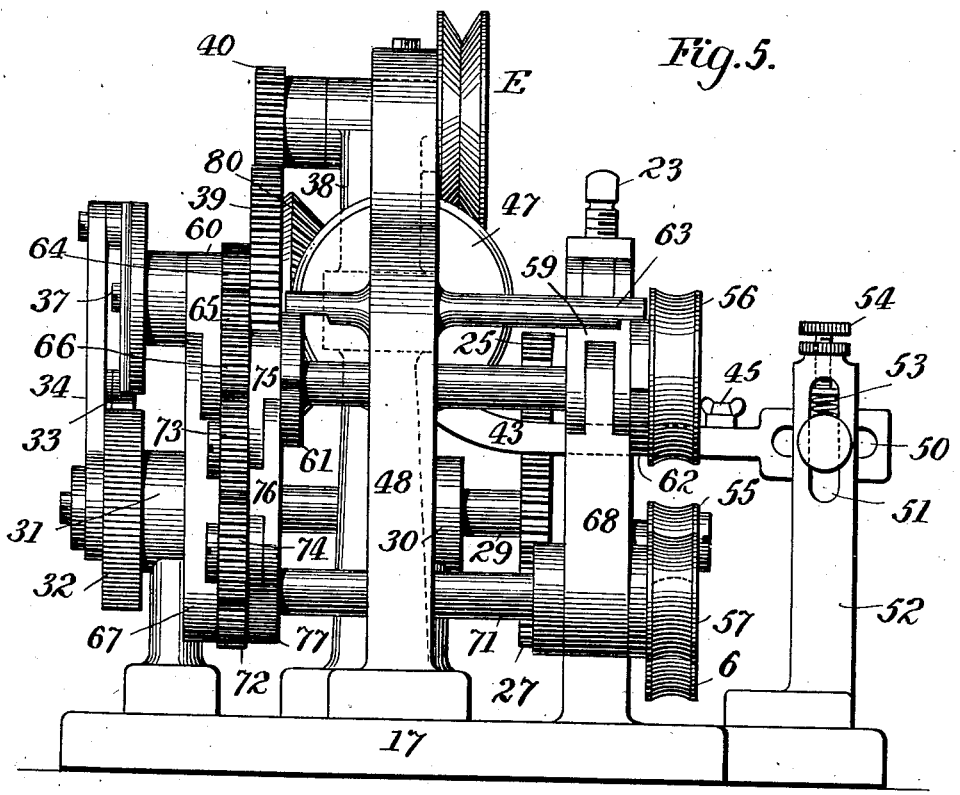

UNITED STATES PATENT OFFICE.

JOHN E. GRAYBILL, OF YORK, PENNSYLVANIA, ASSIGNOR TO GENERAL ELECTRIC COMPANY, A CORPORATION OF NEW YORK.

MACHINE FOR CUTTING GLASS TUBES.

No. 921,828.　　　　　Specification of Letters Patent.　　　Patented May 18, 1909.

Application filed May 13, 1904.　Serial No. 207,846.

*To all whom it may concern:*

Be it known that I, JOHN E. GRAYBILL, a citizen of the United States, residing at York, in the county of York and State of Pennsylvania, have invented certain new and useful Improvements in Machines for Cutting Glass Tubes, of which the following is a specification.

This invention relates to machines for cutting or breaking glass tubes into predetermined lengths.

In the manufacture of incandescent lamps large numbers of accurately and evenly cut tubes are required, from which to form the mounts employed in the base of the lamp to support the filament and anchor-wire. Hitherto the operation of cutting the tubes has been performed by hand, which is expensive and requires a considerable degree of care on the part of the operator to accurately secure the desired lengths and produce an even break. Even with the exercise of the highest practicable degree of care a large number of the cut tubes would be useless on account of variation from the required length or ragged edges.

The object of this invention is to provide means for accurately cutting the tube to the desired length in such manner that the cut edge will be even, and to lessen the cost of and increase the rapidity of manufacture.

In the accompanying drawings I have illustrated my invention in what I consider one of its best embodiments, but it is to be understood that the invention may be embodied in other means.

Figure 1:
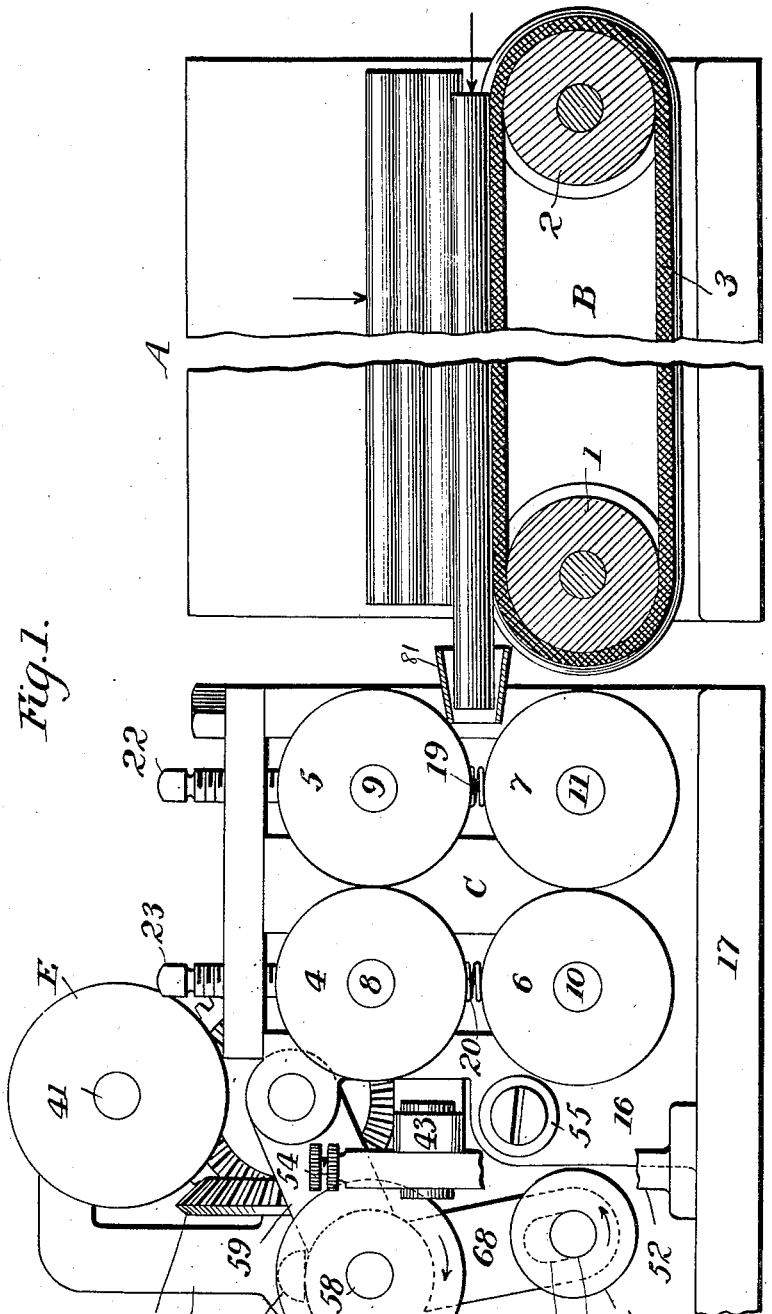
Figure 2:
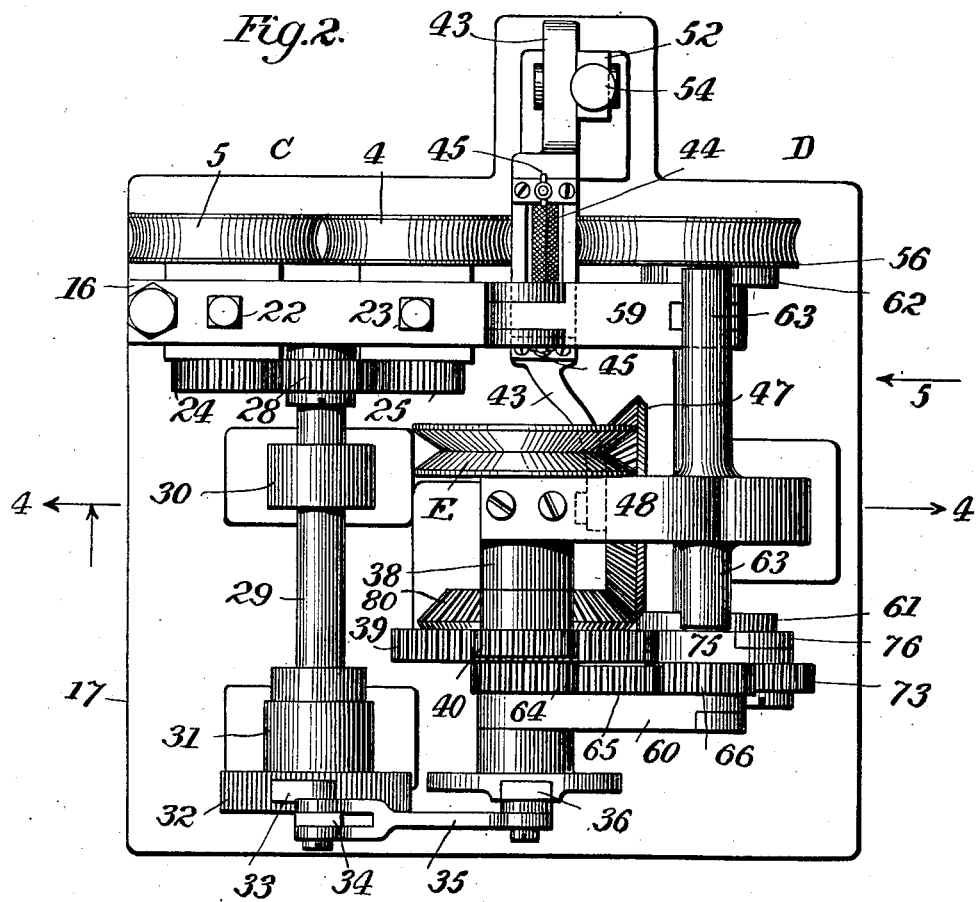
Figure 6:
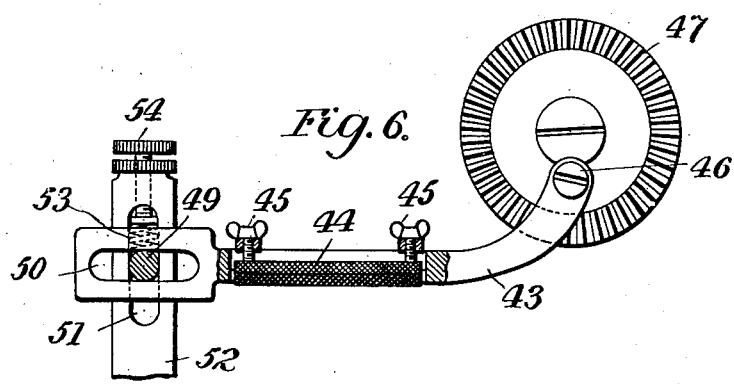

Figure 1 is an elevation of one side of a machine showing a hopper and a conveyer device in connection therewith, the latter being partly in section; Fig. 2 is a plan view of the machine, the conveyer device and hopper being omitted; Fig. 3 is an elevation of the side of the machine opposite to that shown in Fig. 1; Fig. 4 is a vertical section on the line 4—4 of Fig. 2, looking in the direction of the arrow; Fig. 5 is an end view of the machine, looking in the direction of the arrow 5 in Fig. 2; and Fig. 6 is a detail of the scratching device.

Referring to the accompanying drawings, the machine comprises a storage device or hopper A, a conveyer B which receives the tubes from the hopper and carries them forward, a feeding means C which receives the tubes from the conveyer and feeds them forward in predetermined lengths, and a cutting means D which operates to sever the tubes as they are fed forward by the feeding means C. The whole may be driven by means of a pulley E connected by a belt or other suitable means to a source of power.

The hopper A may consist of an inclined plate down which the tubes may roll in the direction indicated by the arrow in Fig. 1. At the lower end of this plate may be located the conveyer which may consist of suitable pulleys 1 and 2, on which is placed an endless belt 3 of rubber or other suitable material and connected with a source of power in such manner as to cause the tubes to move in the direction as indicated by the arrow in Fig. 1.

The feeding means C may comprise the rolls 4, 5, 6 and 7, which preferably have grooved circumferences of rubber or other suitable material and are fixed to shafts 8, 9, 10 and 11, respectively, which are rotatably mounted in cross-heads 12, 13, 14 and 15, respectively, slidably mounted upon a frame 16 fixed to the base 17. The cross-heads are spring-pressed by springs 21, 18, 20 and 19, respectively, so that the feed rolls are held in yielding relation to each other. The tension of these springs may be regulated by means of adjusting screws 22 and 23. Upon the sides of the cross-heads opposite the feed rolls, gears 24, 25, 26 and 27, for driving the feeding means, are fixed to the shafts of the feed rolls. The gears 24 and 25 engage with a gear 28 rotatably supported by the frame 16 and which meshes with a gear 42 fixed to a shaft 29 rotatably mounted in posts 30 and 31 fixed to the base 17. Upon the opposite end of the shaft 29 from the gear 28, is fixed a ratchet wheel 32 with which engages a pawl 33 pivoted to an arm 34. The arm 34 is so supported upon the shaft 29 that it may rock thereon, and is connected by a link 35 with an adjustable crank 36 fixed to a shaft 37 rotatably mounted in a support 38 fixed to the base of the machine. Also fixed to the shaft 37 is a gear 39 meshing with a gear 40 fixed to a shaft 41 which is rotatably mounted in the support 38. Upon the shaft 41 is also fixed the driving pulley E. It will thus be seen that motion may be transmitted from the driving pulley to the rock arm 34 which moves the pawl back and forth over the ratchet wheel 32, so that the latter is intermittently driven and the length of the throw of the pawl may be adjusted by adjusting the length of the crank 36. The gear 42 also meshes with the gears 26 and 27, so that as the gear 42 is driven by the ratchet wheel, the gears 24, 25, 26 and 27 will be turned and the feed rolls to which they are connected will all be moved in the appropriate direction to feed the tube forward to the cutting means. A funnel 81 for guiding the tubes to the feed rolls may be employed.

The cutting means comprises a device for scratching the glass to determine the point of break in a well-known manner and means for breaking the tube. The former may comprise a holder or frame 43 within which is mounted a file 44 secured by thumb screws 45 or other suitable means. One end of the holder is pivotally mounted at 46 upon a bevel gear 47 rotatably mounted in a support 48, so that the holder and with it the file are given a reciprocating motion transverse to the tube to be cut and also a motion about a pivot bar 49, a slot 50 in the holder permitting the transverse movement. The gear 47 may receive its motion from another bevel gear 80 fixed to the shaft 37. The pivot bar 49 is vertically movable in a slot 51 in a supporting post 52 fixed to the base. The pivot bar, however, is yieldingly held against rising by a spring 53 which may be adjusted by means of a screw 54. The file is located just forward of the feed rolls, and preferably directly beneath the point at which the file operates on the glass tube is placed a support 55, preferably a rubber roller, rotatably mounted on the frame 16, which roller serves to support the tube while it is being scratched and also aids in breaking the tube as will be hereinafter described.

The breaking means will now be described. Two rolls 56 and 57 are adapted to receive the tube from the feed rolls and preferably have grooved and resilient circumferences, as in the case of the first mentioned rolls. The roll 56 may be fixed to a shaft 58 rotatably mounted in the ends of links 59 and 60. The link 59 may be pivotally supported by the frame 16, while the link 60 may be similarly supported upon the shaft 37. The shaft 58 has fixed to it cam disks 61 and 62 adapted to engage with the ends of a fixed bar 63 to force the shaft 58 downwardly. The shaft 58 may be suitably geared to the shaft 37 by means of gears 64, 65 and 66, the gear 64 being fixed to the shaft 37 and the gear 66 being fixed to the shaft 58, while the gear 65 is an idler rotatably mounted on the link 60 between the gears 64 and 66. Upon the shaft 58 are mounted links 67 and 68 which may turn thereon. At their other ends the links 67 and 68 have slots 69 and 70 in which a shaft 71 is rotatably supported. The shaft 71 has fixed to it a gear 72 and the roll 57, and gear wheels 73 and 74, rotatably supported on pivoted links 75, 76 and 77, serve to connect the gear 66 with the gear 72. It will thus be seen that the rolls 56 and 57 are flexibly mounted with relation to each other and with relation to the frame of the machine, and also that both are driven by power transmitted from the driving pulley E. It will be noted that the roll 56 is somewhat larger than the roll 57, so that although geared the same it has a greater peripheral speed, and also overhangs it. The purpose of this will be set forth later. A spring 78, which bears at one end against a fixed portion of the machine and at its other end against the link 68, tends to force the shaft 71 against the inclined face 79 of the support 48, so that the rolls 56 and 57, which may be termed the breaking rolls, are forced upwardly and away from the feed rolls. It will be noted that the gearing of the breaking rolls and the direction of rotation of the pulley E should be such that the rolls will rotate as shown by the arrows in Fig. 1.

Having described the machine in detail, the operation may be described as follows. A supply of tubes having been placed upon the hopper A, they will roll down upon the belt 3 which will carry the lowest tube forward, so that its end will enter between the rolls 5 and 7 which are so adjusted that they will be forced apart slightly against the springs 18 and 19 by the entering tube. They will therefore grip the tube and force it onward between the rolls 4 and 6 which will grip the tube in a similar manner and assist in its onward movement. The movement of the feed rolls, as before described, is accomplished by means of the ratchet wheel 32 and pawl 33 which are driven from the adjustable crank 36, and it will be obvious that the rolls will be operated during the movement of the pawl in one direction only, the extent of which movement can be regulated as before described. The pawl having reached the end of its driving stroke, the feed rolls will come to rest, or, in other words, a "dwell" will occur. During the dwell of the feed rolls, the file which has been moved to one extreme of its transverse movement and has been lowered, by virtue of the vertical movement of the pivoted end of the holder, now comes in contact with the glass tube and is moved transversely of the tube by the continued movement of the bevel gear 47, the spring 53 permitting the file to yield as it comes in contact with the tube. The tube having been thus scratched, further movement of the bevel gear 47 causes the file to be raised out of contact with the tube. Immediately preceding the operation just described, the end of the tube which is to be severed has entered between the breaking rolls 56 and 57, which rolls being driven by gearing, as before described, will by reason of their friction upon the tube be impelled along it toward the feed rolls against the spring 78. The highest points of the cam disks 61 and 62 then come in contact with the ends of the arm 63. This operates to force the breaking rolls downwardly, and therefore transverse to the tube, thereby producing a stress tending to bend and therefore causing breakage of the tube at its scratched section, which, as before described, preferably lies over the support 55. Upon the breaking of the tube the spring 78 will force the rolls 56 and 57 outwardly and eject the completed tube from the machine. A cycle of operations will then be completed and may be repeated indefinitely. The overhanging of the roll 56, before referred to, causes the point of pressure of the roll upon the tube to be at a greater distance from the breaking point than the point of pressure of the roll 57. This feature, together with the tension upon the tube caused by the spring 78, the flexibility of the rolls and the greater peripheral speed of the roll 57, causes the desirable features of the hand-breaking operation to be closely imitated by the machine, while the care required by and the disadvantages of that operation are done away with.

It will be observed that the tube is fed forward only while the feed rolls are in motion and that the duration of movement of these rolls may be regulated by the crank 36, and thus the length into which the tube is to be cut may be determined.

Without being limited to the precise construction shown and described, what I claim is:—

1. In a machine for cutting glass tubes, the combination with means for feeding the tubes into position to be cut, of cutting means, means for producing a relative movement between the cutting means and the tubes to scratch them, means for breaking the tubes, and common means for operating said feeding, scratching and breaking means, substantially as set forth.

2. In a machine for cutting glass tubes, the combination with means for feeding the tubes into position to be cut, of cutting means, means for producing a relative movement between the cutting means and the tubes to scratch them and means for breaking the tubes, substantially as described.

3. In a machine for cutting glass tubes, the combination with means for feeding the tubes into position to be cut, of means for scratching the tubes, means for breaking the tubes, and means for driving the feeding means such that there is a dwell during the operation of scratching and breaking, substantially as described.

4. In a machine for cutting glass tubes, the combination with feed rolls, of means for positively driving said feed rolls such that a dwell occurs during each cycle of operations, means for scratching the tubes, means for breaking the tubes, means for operating said scratching and breaking means once during each cycle, and means for varying the amount of feed in each cycle, substantially as described.

5. In a machine for cutting glass tubes, the combination with means for feeding the tubes into position to be cut, of means for scratching the tubes, means for breaking the tubes, and means for actuating said feeding, scratching and breaking means such that said feeding means is operated for a certain portion only of the cycle of operations and said scratching and breaking means are operated at another portion of said cycle, substantially as described.

6. In a machine for cutting glass tubes, the combination of means for feeding the tubes into position to be cut, cutting means, means for producing a relative movement between the cutting means and the tubes to scratch them, breaking means, and supporting means for the tubes between said breaking and feedings means, substantially as set forth.

7. In a machine for cutting glass tubes, the combination of means for feeding the tubes into position to be cut, cutting means, means for producing a relative movement between the cutting means and the tubes to scratch them, and means tending to bend said tubes at their scratched sections, substantially as set forth.

8. In a machine for cutting glass tubes, the combination with means for feeding the tubes into position to be cut, of cutting means, means for producing a relative movement between the cutting means and the tubes to scratch them, and breaking means movable transversely to the tubes, substantially as described.

9. In a machine for cutting glass tubes, the combination of means for feeding the tubes into position to be cut, means for scratching the tubes, vertically movable breaking means, and supporting means for the tubes between said breaking and feeding means, substantially as described.

10. In a machine for cutting glass tubes, the combination with means for feeding the tubes into position to be cut, of vertically movable breaking means, supporting means for the tubes, between said breaking and feeding means, and means for scratching the tubes at a point approximately over the place where said tubes bear upon said supporting means, substantially as described.

11. In a machine for cutting glass tubes, the combination with means for feeding the tubes into position to be cut, of vertically movable breaking means, supporting means for the tubes between the breaking and feeding means, and means for scratching the tubes, the whole being so constructed and arranged that the break will occur when the scratched sections of the tubes are approximately over the said supporting means, substantially as described.

12. A machine for cutting glass tubes, which comprises a breaking means having a pair of rollers one of which overhangs the other, substantially as described.

13. A machine for cutting glass tubes, comprising a breaking means having a pair of rollers one of which has a greater peripheral speed than and overhangs the other, substantially as described.

14. In a machine for cutting glass tubes, the combination with breaking means, of means for producing tension in the tubes at and during the break, said breaking means comprising a pair of rolls one of which has a greater peripheral speed than and overhangs the other, substantially as described.

15. In a machine for cutting glass tubes, the combination with breaking means, of means for producing tension in the tubes at and during the break, said breaking means comprising a pair of flexible rollers of which one has a greater peripheral speed than and overhangs the other, substantially as described.

16. In a machine for cutting glass tubes, the combination of means for feeding a tube longitudinally, a scratching means movable transversely of the tube, and means for applying pressure to said tube on the opposite side of the scratching means from said feeding devices, substantially as and for the purpose described.

17. In a machine for cutting glass tubes, the combination of a reciprocating scratching device, means for feeding a tube into the path of said scratching device, and means for applying pressure to the tube after it has been scratched, substantially as described.

18. In a glass cutting machine, the combination with feeding mechanism for the glass, of a crank pin rotated in predetermined relation to said feeding mechanism, a cutter bar mounted to move in a plane transverse the path of the glass and having one end journaled on said crank pin, cutting means mounted on said bar to engage the glass and a spring pressed guide for the other end of said bar arranged to press said guide and cutting means against the glass.

In testimony whereof I have signed my name to this specification in the presence of two subscribing witnesses.

JOHN E. GRAYBILL.

Witnesses:
ELLEN M. WELLENSICK,
RICHD. E. COCHRAN.